US012578694B2

(12) United States Patent
Huang et al.

(10) Patent No.: US 12,578,694 B2
(45) Date of Patent: Mar. 17, 2026

(54) INTELLIGENT MONITORING METHOD AND APPARATUS FOR ABNORMAL WORKING CONDITIONS IN HEAVY METAL WASTEWATER TREATMENT PROCESS BASED ON TRANSFER LEARNING AND STORAGE MEDIUM

(71) Applicant: CENTRAL SOUTH UNIVERSITY, Changsha (CN)

(72) Inventors: Keke Huang, Changsha (CN); Haofei Wen, Changsha (CN); Chunhua Yang, Changsha (CN); Hongqiu Zhu, Changsha (CN); Yonggang Li, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 852 days.

(21) Appl. No.: 17/908,922

(22) PCT Filed: Feb. 25, 2021

(86) PCT No.: PCT/CN2021/077910
§ 371 (c)(1),
(2) Date: Sep. 2, 2022

(87) PCT Pub. No.: WO2021/185044
PCT Pub. Date: Sep. 23, 2021

(65) Prior Publication Data
US 2023/0089156 A1 Mar. 23, 2023

(30) Foreign Application Priority Data
Mar. 19, 2020 (CN) .......................... 202010194359.2

(51) Int. Cl.
*G05B 13/04* (2006.01)
*C02F 1/00* (2023.01)

(52) U.S. Cl.
CPC .............. *G05B 13/042* (2013.01); *C02F 1/00* (2013.01)

(58) Field of Classification Search
CPC ............. G05B 13/042; C02F 2209/003; C02F 2209/001
See application file for complete search history.

(56) References Cited

U.S. PATENT DOCUMENTS

2016/0358075 A1 12/2016 Zhang et al.

FOREIGN PATENT DOCUMENTS

CN 104182642 A 12/2014
CN 104199441 A * 12/2014
(Continued)

OTHER PUBLICATIONS

Bourgeois, Wilfrid, Joanna E. Burgess, and Richard M. Stuetz. "Onaline monitoring of wastewater quality: a review." (2001): 337-348. (Year: 2001).*
(Continued)

*Primary Examiner* — Schyler S Sanks
(74) *Attorney, Agent, or Firm* — PORUS IP LLC

(57) ABSTRACT

An intelligent monitoring method and apparatus for abnormal working conditions in a heavy metal wastewater treatment process based on transfer learning and a storage medium are provided. During an intelligent monitoring, the abnormal working conditions can be automatically and intelligently recognized by fusing data in the treatment process of the heavy metal wastewater different in source; specifically, a normal sample $Y^{SD}$ in the treatment process of the heavy metal wastewater with fixed sources and a small number of normal samples $Y^{TD}$ in the treatment process of the heavy metal wastewater with unknown sources are utilized; and first, a data representation dictionary $D^{SD}$ of $Y^{SD}$ is obtained through learning on $Y^{SD}$, and then consid-
(Continued)

ering different distribution of $Y^{SD}$ and $Y^{TD}$, a transfer learning method is adopted to fuse characters of $Y^{TD}$ into a dictionary learning process to obtain a dictionary $D^{TD}$ with higher generalization ability.

15 Claims, 1 Drawing Sheet

(56)            References Cited

FOREIGN PATENT DOCUMENTS

| | | | |
|---|---|---|---|
| CN | 110579967 A | 12/2019 | |
| CN | 110580488 A | 12/2019 | |
| CN | 111427265 A | 7/2020 | |

OTHER PUBLICATIONS

Peng, Xin, et al. "Multimode process monitoring and fault detection: A sparse modeling and dictionary learning method." IEEE Transactions on Industrial Electronics 64.6 (2017): 4866-4875. (Year: 2017).*

Yang, Chunhua, et al. "Multimode process monitoring based on robust dictionary learning with application to aluminium electrolysis process." Neurocomputing 332 (2019): 305-319. (Year: 2019).*

CN104199441A Translation (Year: 2014).*

Chao Ning, et al., Sparse Contribution Plot for Fault Diagnosis of Multimodal Chemical Processes, IFAC—PapersOnLine, 2015, pp. 619-626, vol. 48, No. 21.

Guo Xiao-Ping, et al., Fault Detection of Multi-mode Processes Employing Sparse Residual Distance, Acta Automatica Sinica, 2019, pp. 617-625, vol. 45, No. 3.

* cited by examiner

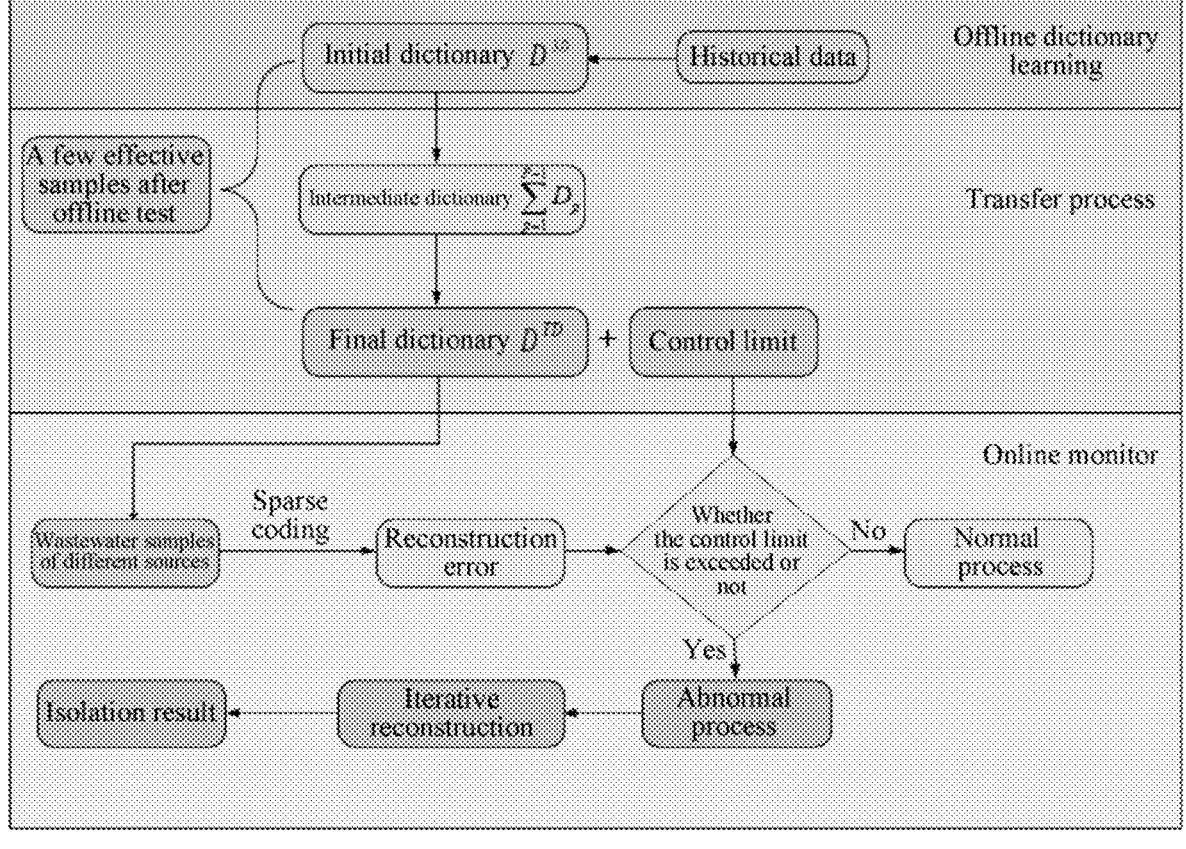

INTELLIGENT MONITORING METHOD AND APPARATUS FOR ABNORMAL WORKING CONDITIONS IN HEAVY METAL WASTEWATER TREATMENT PROCESS BASED ON TRANSFER LEARNING AND STORAGE MEDIUM

CROSS REFERENCE TO THE RELATED APPLICATIONS

This application is the national phase entry of International Application No. PCT/CN2021/077910, filed on Feb. 25, 2021, which is based upon and claims priority to Chinese Patent Application No. 202010194359.2, filed on Mar. 19, 2020, the entire contents of which are incorporated herein by reference.

TECHNICAL FIELD

The present invention belongs to the field of heavy metal waste water treatment, and particularly relates to an intelligent monitoring method and apparatus for abnormal working conditions in a heavy metal wastewater treatment process based on transfer learning and a storage medium.

BACKGROUND

The reserve and quality of water, as an irreplaceable natural resource and environmental resource on the earth, are closely linked with survival and development of the human being.

Along with high-speed development of the industry in recent years, industrial wastewater, particularly heavy metal wastewater seriously pollutes the environment and deeply harms the human being. Meanwhile, heavy metal is high in stability, hard to degrade and wide in transfer range in the environment, which gradually becomes a global environmental issue.

A flocculation-electrochemistry technology is one of effective paths for achieving deep purification of the heavy metal wastewater. The technology adopts an electrochemistry technology to deeply treat wastewater treated in a conventional flocculation settling process so that reagent consumption can be reduced, and compared with single wastewater treatment through electric flocculation, electric energy can be saved. On one hand, the effect of treating the wastewater by the existing flocculation-electrochemistry technology is affected by multiple process factors (such as pH value, current density and conductivity). On the other hand, there are uncertainties in the source of the heavy metal wastewater are uncertain, including climate change, artificial destruction, accidental pollution, uncertain mechanisms of many interior biochemical reaction processes, etc. Therefore, the characters of the heavy metal wastewater are hard to describe by a specific mathematic relation. In addition, the heavy metal wastewater of different sources has great ion concentration distribution differences, and the treatment effect of the heavy metal wastewater can only be acquired by long-time off-line tests. At present, treatment working conditions of the heavy metal wastewater of different sources are mainly judged by experience of technical personnel, and normal working conditions and abnormal working conditions in a treatment process are usually hard to accurately recognize. When the abnormal working conditions occur, heavy metal ion concentration in the wastewater is hard to effectively reduce, and if the treatment process is not adjusted in time, the treatment result will influence the effect of a next procedure. The manual treatment manner is high in operation subjectivity and blindness, and particularly, when the source of the heavy metal wastewater changes, the working condition recognition accuracy is low.

SUMMARY

The present invention provides an intelligent monitoring method and apparatus for abnormal working conditions in a heavy metal wastewater treatment process based on transfer learning and a storage medium for accurately recognizing the abnormal working conditions in the treatment process of heavy metal wastewater of different sources and meanwhile solving problems caused by model mismatch due to data distribution distortion caused by ion concentration data of the heavy metal wastewater of different sources, and the method can adapt to the heavy metal wastewater of different sources and accurately recognize the working conditions in the treatment process.

Dictionary learning is an efficient data representation mode and assumes that signals can be sparsely represented, i.e., represented in a dictionary and sparse coding product form, and high-dimensional signal data can be restored by learning and storing a dictionary with a small data size, which is highly effective to high-dimensional data processing. More and more attention is paid to dictionary learning due to the reduction of high-dimensional data calculation and storage loads.

In this technical solution, historical data including pH value, current density, conductivity, initial heavy metal concentration, flow and other indexes in the treatment process are modeled, and when the wastewater treatment process is monitored online, the detection effect is possibly not guaranteed by using a model obtained according to the historical data since initial heavy metal concentrations of the wastewater of different sources are differentially distributed in time sequence. Thus, the treatment result on the heavy metal wastewater uncertain in source is tested offline, data (data about effective reduction of heavy metal ion concentration in the wastewater) under normal working conditions are selected according to a test result and fused with historical data under normal working conditions and certain sources, and transfer learning is performed on a historical model, such that abnormal working condition detection in the treatment process of the wastewater different in source is achieved.

The technical solution of the present invention is as below:

In one aspect, an intelligent monitoring method for abnormal working conditions in a heavy metal wastewater treatment process based on transfer learning includes:

1) constructing an offline dictionary for heavy metal wastewater treatment data samples with fixed sources according to historically-collected heavy metal wastewater treatment data samples with fixed sources;

2) acquiring an augmented dictionary corresponding to effective heavy metal wastewater treatment data samples with unknown sources by utilizing historically-collected effective heavy metal wastewater treatment data samples with unknown sources to perform transfer learning on the offline dictionary;

3) calculating a reconstruction error of the effective heavy metal wastewater treatment data samples with unknown sources through the augmented dictionary, and acquiring a control limit under a working condition in the heavy metal wastewater treatment process through kernel density estimation based on the reconstruction error; and 4) calculating a reconstruction error of to-be-monitored data $y_i$ under the augmented dictionary $D^{TD}$, where if the calculated reconstruction error is less than the control limit, it is considered that the current heavy metal wastewater treatment process is normal, otherwise, it is considered that the current heavy metal wastewater treatment process is abnormal.

Further, the construction of the offline dictionary for the heavy metal wastewater treatment data samples with fixed sources includes the following steps:

step 1.1: collecting historical samples, wherein a sensor is utilized for collecting heavy metal wastewater treatment historical samples with fixed sources, and a sample set with fixed sources is $Y^{SD}$; $Y^{SD}=[y_1, y_2, \ldots, y_N] \in R^{m \times N}$, $y_i$ represents the ith heavy metal wastewater treatment historical sample with fixed source, $1 \le i \le N_s$, each sample includes m wastewater indexes {pH value, current density, conductivity, initial heavy metal concentration and flow}, and $N_s$ represents the number of samples in $Y^{SD}$; and step 1.2: representing $Y^{SD}$ through a dictionary $D_1$ and sparse coding X based on a sparse representation principle, constructing an objective function of offline dictionary learning, and acquiring an optimal initial dictionary $D^{SD}$ corresponding to $Y^{SD}$ and sparse coding $X^{SD}$ corresponding to $D^{SD}$ by solving the objective function of offline dictionary learning, $$\langle D^{SD}, X^{SD} \rangle = \arg \min_{D_1, X} \| Y^{SD} - D_1 X \|_2^2$$

$$\text{s.t.} \forall_i, \|x_i\|_0 \le T$$

wherein, the initial value of the dictionary $D_1$ is a matrix formed by in-column arranging of K samples randomly selected from a historical sample set $Y^{SD}$, K=10*m, T is a set value of the number of nonzero elements in each column of a sparse coding matrix, and $$\|\cdot\|_2^2$$

and $\|\cdot\|_0$ represent 2-norm and 0-norm correspondingly; and $x_i$ represents the ith column in X.

The final value of the dictionary $D_1$ is $D^{SD}$, the initial value of $D_1$ in each column is a randomly-selected sample, and $D_1$ has K columns; the final value of the sparse coding X is $X^{SD}$ and $X^{SD}$ represents sparse coding of $Y^{SD}$ under $D^{SD}$, and each column in $D^{SD}$ represents one dictionary atom;

the value of T is commonly set to 2; and further, the objective function of offline dictionary learning is solved through a K-SVD method, and the dictionary $D_1$ and the sparse coding X are constantly updated until an optimal initial dictionary $D^{SD}$ corresponding to $Y^{SD}$ is obtained.

The solving through the K-SVD method specifically includes the following steps: randomly selecting K samples from $Y^{SD}$ to serve as initial values of the dictionary $D^{SD}$, and then acquiring the sparse coding $X^{SD}$ through an orthogonal matching pursuit algorithm; and updating the dictionary $D_1$ by column. For example, when kth-column dictionary atoms are updated, it may be written in the following form, and $x_T^k$ represents the kth line in X.

$$\langle d_k, x_T^k \rangle = \left\| Y^{SD} - \sum_{j \neq k} d_j x_T^j - d_k x_T^k \right\|_F^2$$

$$= \| E_k - d_k x_T^k \|_F^2$$

$E_k$ is equal to $$Y^{SD} - \sum_{j \neq k} d_j x_T^j.$$

A defined set $$\omega_k = \{ i \mid 1 \le i \le N, x_T^k(i) \neq 0 \}$$

represents an index set of indexes where nonzero terms are located in $$x_T^k, x_T^k(i)$$

represents the ith element of $$x_T^k,$$

and N represents the number of elements in $x_T^k$. $\Omega_k$ is defined as a $N \times |\omega_k|$ matrix, the value thereof at $(\omega_k(i), i)$ is 1, and the rest of values are all 0. By multiplying $\Omega_k$ and $$x_T^k$$

and $E_k$, original matrices may be shrunk $$x_R^k = x_T^k \Omega_k, E_k^R = E_k \Omega_k.$$

After singular value decomposition is performed on $$E_k^R, E_k^R = U \Delta V^T, d_k = u(:, 1) \text{ and } x_R^k = \Delta(1,1)v(:, 1)$$

are obtained; and the sparse coding $X^{SD}$ is alternately updated through the orthogonal matching pursuit algorithm after updating is finished column by column. The optimal initial dictionary $D^{SD}$ is obtained after iteration updating is performed certain times.

Further, the acquiring the augmented dictionary by utilizing historically-collected effective heavy metal wastewater treatment data samples with unknown sources to perform transfer learning on the offline dictionary includes the following steps:

utilizing a sensor for collecting effective heavy metal wastewater treatment historical samples with unknown sources, wherein an effective sample set with unknown sources is $Y^{TD}$; and utilizing an initial dictionary $D^{SD}$ and corresponding sparse coding X for representing the $Y^{TD}$ based on a sparse representation principle, constructing an objective function of sparse coding corresponding to heavy metal wastewater treatment data samples with unknown sources, solving optimal sparse coding $X^P$ corresponding to the effective sample set $Y^{TD}$ with unknown sources through transfer learning, and then acquiring a corresponding optimal dictionary through $X^P$;

$$X_p = \arg\min_X \left\| Y^{TD} - D_p X \right\|_2^2$$

$$\text{s.t.} \forall_i, \|x_i\|_0 \leq T,$$

where, $D_p$ represents an interpolation dictionary in a transfer learning process, the initial value of $D^p$ represents an optimal initial dictionary $D^{SD}$ corresponding to the offline dictionary for the heavy metal wastewater treatment data samples with fixed sources, namely, when p=0, $D_0=D^{SD}$; T is a set value of the number of the nonzero elements in the sparse coding matrix, and $$\|\cdot\|_2^2$$

and $\|\cdot\|_0$ represents 2-norm and 0-norm correspondingly; and $x_i$ represents the ith column in X.

Further, the optimal dictionary corresponding to the effective sample set $Y^{TD}$ with unknown sources is solved by constructing the objective function of the dictionary corresponding to the heavy metal wastewater treatment data samples with unknown sources;

$$D_{p+1} = \arg\min_D \left\| Y^{TD} - D X_p \right\|_F^2 + \lambda \left\| D - D_p \right\|_F^2$$

where, $\lambda$ represents a tuning parameter, and is [1,10]; D represents a to-be-solved dictionary, $D_{p+1}$ is assigned to a final dictionary solved through iteration, and $D_{p+1}$ represents the optimal dictionary corresponding to the solved effective sample set $Y^{TD}$ with unknown sources; the process of solving is as below: an updating result, $$D_{p+1} = \left( \lambda D_p + Y^{TD} X_p^T \right) \left( \lambda E + X_p X_p^T \right)^{-1},$$

of the interpolation dictionary is acquired by deriving $$\left\| Y^{TD} - D X_p \right\|_F^2 + \lambda \|D - D_p\|_F^2,$$

dictionary atoms of the augmented dictionary are zoomed, $$D^{TD} = \left\{ \frac{d_1^{TD}}{\|d_1^{TD}\|_2}, \cdots, \frac{d_K^{TD}}{\|d_K^{TD}\|_2} \right\},$$

the process is repeated until $$\|D_{p+1} - D_p\|_F^2 \leq \delta,$$

and $\delta$ represents a stopping threshold set to 0.01; and $X_p$ represents sparse coding obtained in the pth-time iteration process, $$X_p^T$$

is transposition of $X_p$, E is a unit matrix, and $$d_1^{TD} \text{ and } d_K^{TD}$$

represent the 1st column and the Kth column of the augmented dictionary $D^{TD}$.

Further, the calculation of the reconstruction error refers to 2-norm calculation of a sample collection value of a to-be-calculated reconstruction error and an expression value of the augmented dictionary for samples and corresponding sparse coding.

Further, the acquiring the control limit under a working condition in the heavy metal wastewater treatment process through kernel density estimation refers to calculating a kernel density function for reconstruction errors of historical samples with unknown sources according to a following formula, and the value of the kernel density function under a set confidence level serves as the corresponding control limit:

$$\hat{f}(e, H) = \frac{1}{n} \sum_{i=1}^{n} K\left[ H^{-1/2}(e - e_i) \right]$$

where, e represents distribution of to-be-fitted reconstruction errors of the historical samples with unknown sources, $e_i$ represents a reconstruction error of the ith historical sample with unknown sources, H represents a bandwidth matrix, n represents the sum of the historical samples, and K[g] represents a kernel function; and $f(e,H)$ refers to a curve fitted through the historical samples $e_i$ with unknown sources under a given bandwidth matrix H.

In this example, a gaussian kernel function is adopted as the kernel function, a diagonal matrix is adopted as the bandwidth matrix, and a confidence level is set to 0.98.

Further, direction selection vectors are sequentially set by setting an abnormal wastewater index positioning objective function, and a reconstruction error of each wastewater index under the augmented dictionary is calculated until abnormal amplitudes on abnormal samples are converged to determine abnormal wastewater indexes;

$$(\hat{x}_{ri}, \hat{f}_i) = \arg\min_{x_i, f_i} \left\| y_f - \xi_i f_i - D^{TD} x_{ri} \right\|_2^2$$

$$\text{s.t.} \|\hat{x}_{ri}\|_0 \leq T$$

$$Re_i = \left\| y_f - \xi_i \hat{f}_i - D^{TD} \hat{x}_i \right\|, \forall_i$$

where, $y_f$ is an abnormal sample in the wastewater treatment process, $y_i = y_f - \xi_i f_i$, $y_i$ is a to-be-reconstructed sample in which the ith-dimension index of $y_f$ is isolated, and the values of other dimensions of indexes are kept unchanged, and $f_i$ is a reconstruction amplitude of the ith-dimension index in $y_f$; $x_{pi}$ is sparse coding of $y_i$ under the augmented dictionary, and the initial value of $x_{ri}$ is sparse coding of $y_f$ under the augmented dictionary; $Re_i$ is a reconstruction error of the ith wastewater index in $y_f$ on the augmented dictionary, and $D^{TD}$ represents the augmented dictionary; $\xi_i$ represents a direction selection vector, if the ith element on the vector is 1, it means that the ith index is selected at this time, and other elements are all 0, $\xi_i \in R^m$; and $\hat{x}_n$ and $\hat{f}_i$ are end values obtained after optimizing $x_n$ and $f_i$ through an argmin objective function.

Indexes for selection of the direction selection vector are constantly changed, for example, a first-dimension variable represents pH value, $\xi_1 = [1,0,0, \ldots 0,0]^T$ represents a selective vector for the pH value, and an abnormal index is determined by finding an i value corresponding to a minimum reconstruction error.

In another aspect, an intelligent monitoring apparatus for abnormal working conditions in a heavy metal wastewater treatment process based on transfer learning includes:

an offline dictionary construction module for constructing an offline dictionary by utilizing historically-collected heavy metal wastewater treatment data samples with fixed sources;

an augmented dictionary construction module for performing transfer learning on the offline dictionary through historically-collected effective heavy metal wastewater treatment data samples with unknown sources to construct an augmented dictionary;

a control limit generation module configured to calculate reconstruction errors of all the historical samples through the augmented dictionary, and calculate a control limit under a working condition in a heavy metal wastewater treatment process through a kernel density estimation method based on the reconstruction errors of all the historical samples; and a working condition abnormality judgment module configured to calculate a reconstruction error of to-be-monitored data acquired online according to the augmented dictionary, compare the reconstruction error of the to-be-monitored data with the control limit and judge whether a current heavy metal wastewater treatment process working condition is abnormal or not according to a comparison result.

In another aspect, provided is a computer storage medium, configured to store programs, wherein when being executed, the programs are used for implementing the intelligent monitoring method for abnormal working conditions in a heavy metal wastewater treatment process based on transfer learning.

Beneficial effects

According to the intelligent monitoring method and apparatus for abnormal working conditions in a heavy metal wastewater treatment process based on transfer learning and the storage medium provided in the present invention, with consideration that wastewater sources are different and data distribution of the wastewater of different sources is quite different in the heavy metal wastewater treatment process, a conventional method cannot accurately recognize the working conditions in the heavy metal wastewater treatment process; the abnormal working conditions in the treatment process of the heavy metal wastewater of different sources can be automatically and intelligently recognized by fusing data in the treatment process of the heavy metal wastewater of different sources; specifically, a normal sample $Y^{SD}$ in the treatment process of the heavy metal wastewater with fixed sources and a small number of normal samples $Y^{TD}$ in the treatment process of the heavy metal wastewater with unknown sources are utilized; and first, a data representation dictionary $D^{SD}$ of $Y^{SD}$ is obtained through learning on $Y^{SD}$, and then considering different distribution of $Y^{SD}$ and $Y^{TD}$, a transfer learning method is adopted to fuse characters of $Y^{TD}$ into a dictionary learning process to obtain a dictionary $D^{TD}$ with higher generalization ability. With the consideration that $D^{TD}$ considers both the characters of $Y^{SD}$ and distribution difference of $Y^{TD}$ into a model, $D^{TD}$ has higher data representation ability and thus can accurately recognize abnormal working conditions of the heavy metal wastewater of different sources online. The method can adapt to uncertain factors in a wastewater treatment system without process priori knowledge, can more accurately detect changes of related indexes in the process and achieves timely detection and early warning.

BRIEF DESCRIPTION OF THE DRAWINGS

FIG. 1s a detailed flow schematic diagram of an example of the present invention.

DETAILED DESCRIPTION

The present invention will be further described in detail below with reference to the accompanying drawings and the embodiments.

As shown in the figure, in this example, an intelligent monitoring method for abnormal working conditions in a heavy metal wastewater treatment process based on transfer learning includes:

1) Construct an offline dictionary for heavy metal wastewater treatment data samples with fixed sources according to historically-collected heavy metal wastewater treatment data samples with fixed sources.

The construction of the offline dictionary for the heavy metal wastewater treatment data samples with fixed sources includes the following steps:

step 1.1: collecting historical samples, wherein a sensor is utilized for collecting heavy metal wastewater treatment historical samples with fixed sources, and a sample set with fixed sources is $Y^{SD}$; $Y^{SD} = [y_1, y_2, \ldots, y_N] \in R^{m \times N}$, $y_i$ represents the ith heavy metal wastewater treatment historical sample with fixed source, $1 < i \leq N_s$, each sample includes m wastewater indexes {pH value, current density, conductivity, initial heavy metal concentration and flow}, and $N_s$ represents the number of samples in $Y^{SD}$; and step 1.2: representing $Y^{SD}$ through a dictionary $D_1$ and sparse coding X based on a sparse representation principle, constructing an objective function of offline dictionary learning, and acquiring an optimal initial dictionary Du corresponding to $Y^{SD}$ and sparse coding $X^{SD}$ corresponding to $D^{SD}$ by solving the objective function of offline dictionary learning, $$\langle D^{SD}, X^{SD} \rangle = \arg \min_{D_1, X} \| Y^{SD} - D_1 X \|_2^2 \tag{1}$$

$$s.t. \forall_i, \|x_i\|_0 \leq T$$

where, the initial value of the dictionary $D_1$ is a matrix formed by in-column arranging of K samples randomly selected from a historical sample set $Y^{SD}$, K=10*m, T is a set value of the number of nonzero elements in each column of a sparse coding matrix, and $$\|\cdot\|_2^2$$

and $\|\cdot\|_0$ represent 2-norm and 0-norm correspondingly; $x_i$ represents the ith column in X.

The final value of the dictionary $D_1$ is $D^{SD}$, the initial value of $D_1$ in each column is a randomly-selected sample, and $D_1$ has K columns; the final value of the sparse coding X is $X^{SD}$; and $X^{SD}$ represents sparse coding of $Y^{SD}$ under $D^{SD}$, and each column in $D^{SD}$ represents one dictionary atom;

the value of T is commonly set to 2; and the objective function of offline dictionary learning is solved through a K-SVD method, and the dictionary $D_1$ and the sparse coding X are constantly updated until an optimal initial dictionary $D^{SD}$ corresponding to $Y^{SD}$ is obtained.

The solving through the K-SVD method specifically includes the following steps: randomly selecting K samples from $Y^{SD}$ to serve as initial values of the dictionary $D^{SD}$, and then acquiring the sparse coding $X^{SD}$ through an orthogonal matching pursuit algorithm; and updating the dictionary $D_1$ by column. For example, when kth-column dictionary atoms are updated, it may be written in the following form, and $x_T^k$ represents the kth line in X.

$$\langle d_k, x_T^k \rangle = \left\| Y^{SD} - \sum_{j \neq k} d_j x_T^j - d_k x_T^k \right\|_F^2 \quad (2)$$

$$= E_k - d_k x_T^k \|_F^2$$

$E_k$ is equal to $$Y^{SD} - \sum_{j \neq k} d_j x_T^j.$$

A defined set $$\omega_k = \{i | 1 \leq i \leq N, x_T^k(i) \neq 0\}$$

represents an index set of indexes where nonzero terms are located in $$x_T^k. \Omega_k$$

is defined as a $N \times |\Omega_k|$ matrix, the value thereof at $(\omega_k(i), i)$ is 1, and the rest of values are all 0. By multiplying $\Omega_k$ and $$x_T^k \text{ and } E_k,$$

original matrices may be shrunk $$x_R^k = x_T^k \Omega_k, E_k^R = E_k \Omega_k.$$

After singular value decomposition is performed on $$E_k^R, E_k^R = U\Delta V^T, d_k = u(:, 1) \text{ and } x_R^k = \Delta(1, 1)v(:, 1)$$

are obtained; and the sparse coding $X^{SD}$ is alternately updated through the orthogonal matching pursuit algorithm after updating is finished column by column. The optimal initial dictionary $D^{SD}$ is obtained after iteration updating is performed certain times.

2) Acquire an augmented dictionary corresponding to effective heavy metal wastewater treatment data samples with unknown sources by utilizing the historically-collected effective heavy metal wastewater treatment data samples with unknown sources to perform transfer learning on the offline dictionary.

The acquiring the augmented dictionary by utilizing historically-collected effective heavy metal wastewater treatment data samples with unknown sources to perform transfer learning on the offline dictionary includes the following steps:

utilizing a sensor for collecting effective heavy metal wastewater treatment historical samples with unknown sources, wherein an effective sample set with unknown sources is $Y^{SD}$; and utilizing an initial dictionary $D^{SD}$ and corresponding sparse coding X for representing the $Y^{SD}$ based on a sparse representation principle, constructing an objective function of sparse coding corresponding to heavy metal wastewater treatment data samples with unknown sources, solving optimal sparse coding $X^P$ corresponding to the effective sample set $Y^{TD}$ with unknown sources through transfer learning, and then acquiring a corresponding optimal dictionary through $X^P$;

$$X_p = \arg\min_X \left\| Y^{TD} - D_p X \right\|_2^2 \quad (3)$$

$$s.t. \forall_i, \|x_i\|_0 \leq T,$$

where, $D_p$ represents an interpolation dictionary in a transfer learning process, the initial value of $D_p$ represents an optimal initial dictionary $D^{SD}$ corresponding to the offline dictionary for the heavy metal wastewater treatment data samples with fixed sources, namely, when p=0, $D_0=D^{SD}$; T is a set value of the number of the nonzero elements in each column in the sparse coding matrix, and $$\|\cdot\|_2^2$$

and $\|\cdot\|_0$ represent 2-norm and 0-norm correspondingly; and $x_i$ represents the ith column in X.

To constantly reduce representation errors of newly-distributed data while keeping continuity of an interpolation dictionary model, an optimal dictionary corresponding to the effective sample set $Y^{SD}$ with unknown sources is solved by constructing the objective function of the dictionary corresponding to the heavy metal wastewater treatment data samples with unknown sources;

$$D_{p+1} = \arg\min_{D} \|Y^{TD} - DX_p\|_F^2 + \lambda\|D - D_p\|_F^2 \qquad (4)$$

where, $\lambda$ represents a tuning parameter, and is [1,10]; D represents a to-be-solved dictionary, $D_{p+1}$ is assigned to a final dictionary solved through iteration, and $D_{p+1}$ represents the optimal dictionary corresponding to the solved effective sample set $Y^{TD}$ with unknown sources; the process of solving is as below:
an updating result of an interpolation dictionary is acquired by deriving $$\|Y^{TD} - DX_p\|_F^2 + \lambda\|D - D_p\|_F^2 :$$

$$D_{p+1} = \left(\lambda D_p + Y^{TD}X_p^T\right)\left(\lambda E + X_p X_p^T\right)^{-1} \qquad (5)$$

zooming is performed on dictionary atoms of the augmented dictionary to guarantee that L2 norm representing the dictionary atoms is equal to 1:

$$D^{TD} = \left\{ \frac{d_1^{TD}}{\|d_1^{TD}\|_2}, \cdots, \frac{d_K^{TD}}{\|d_K^{TD}\|_2} \right\} \qquad (6)$$

(3)-(6) are repeated until $$\|D_{p+1} - D_p\|_F^2 \le \delta, \delta$$

represents a stopping threshold set to 0.01; and
$X_p$ represents sparse coding obtained in the pth-time iteration process, $$X_p^T$$

is transposition of $X_p$ E is a unit matrix, and $$d_1^{TD} \text{ and } d_k^{TD}$$

represent the 1st column and the Kth column of the augmented dictionary $D^{TD}$.

Algorithm 1. Cross distributed data sparse representation based on transfer dictionary learning
Input: historical data $y_{SD}$, a few analyzed data $Y^{TD}$, the sparse constraint T, the dictionary size K, the iteration times P, the stopping threshold $\delta$ which are determined commonly through experience and manual parameter adjustment
the dictionary size K is commonly set as a decuple variable, namely 10*m. The sparse constraint is commonly set to 1-2, the iteration times P is commonly set to 100, and the stopping threshold is set to 0.01.

Initialize: the historical data $Y^{SD}$ is utilized for obtaining an initialized dictionary $D^{SD}$ according to a K-SVD algorithm, and an interpolation model parameter p is set to 0.
When $$\|D_{p+1} - D_p\|_F^2 \le \delta, \text{ and } p < P,$$

1. Perform sparse representation on newly-distributed data $Y^{TD}$ under the current interpolation dictionary $D_p$ according to the formula (3) to obtain sparse coding $X_p$.
2. Update an interpolation dictionary model according to the formulas (4)-(5) while limiting a dictionary change amplitude
3. p←p+1
4. Perform dictionary atom normalization according to the formula (6)
Cycle End
A dictionary under new distribution is obtained $D^{TD}$
Output: a final dictionary $D^{TD}$
3) Calculate a reconstruction error of the effective heavy metal wastewater treatment data samples with unknown sources through the augmented dictionary, and acquire a control limit under a working condition in the heavy metal wastewater treatment process through kernel density estimation based on the reconstruction error.
The acquiring the control limit under a working condition in the heavy metal wastewater treatment process through kernel density estimation refers to calculating a kernel density function for reconstruction errors of historical samples with unknown sources according to a following formula, and the value of the kernel density function under a set confidence level serves as the corresponding control limit:

$$\hat{f}(e, H) = \frac{1}{n}\sum_{i=1}^{n} K\left[H^{-1/2}(e - e_i)\right]$$

where, e represents distribution of to-be-fitted reconstruction errors of the historical samples with unknown sources, $e_i$ represents a reconstruction error of the ith historical sample with unknown sources, H represents a bandwidth matrix, n represents the sum of the historical samples, and K[g] represents a kernel function; and $f(e,H)$ refers to a curve fitted through the historical samples $e_i$ with unknown sources under a given bandwidth matrix H.
In this example, a gaussian kernel function is adopted as the kernel function, a diagonal matrix is adopted as the bandwidth matrix, and a confidence level is set to 0.98.
4) Calculate a reconstruction error of to-be-monitored data $y_i$ under the augmented dictionary $D^{TD}$. If the calculated reconstruction error is less than the control limit, it is considered that the current heavy metal wastewater treatment process is normal, otherwise, it is considered that the current heavy metal wastewater treatment process is abnormal.
The calculation of the reconstruction error refers to 2-norm calculation of a sample collection value of a to-be-calculated reconstruction error and an expression value of the augmented dictionary for samples and a corresponding sparse coding.

Abnormal detection and abnormal index isolation are performed on the working condition of the wastewater treatment process based on the obtained dictionary model:

direction selection vectors are sequentially set by setting an abnormal wastewater index positioning objective function, and a reconstruction error of each wastewater index under the augmented dictionary is calculated until abnormal amplitudes on abnormal samples are converged to determine abnormal wastewater indexes;

$$(\hat{x}_{ri}, \hat{f}_i) = \operatorname*{argmin}_{x_i, f_i} \left\| y_f - \xi_i f_i - D^{TD} x_{ri} \right\|_2^2$$

$$\text{s.t. } \left\| \hat{x}_{ri} \right\|_0 \le T$$

$$Re_i = \left\| y_f - \xi_i \hat{f}_i - D^{TD} \hat{x}_i \right\|, \forall_i$$

where, $y_1$ is an abnormal sample in the wastewater treatment process, $Y_i = Y_f - \xi_i f_i$, $y_i$ is a to-be-reconstructed sample in which the ith-dimension index of $y_f$ is isolated, and the values of other dimensions of indexes are kept unchanged, and $f_i$ is a reconstruction amplitude of the ith-dimension index in $y_f$; $x_i$ is sparse coding of $y_i$ under the augmented dictionary, and the initial value of $x_{ri}$ is sparse coding of $y_f$ under the augmented dictionary; $Re_i$ is a reconstruction error of the ith wastewater index in $Y_f$ on the augmented dictionary, and $D^{TD}$ represents the augmented dictionary; $\xi$ represents a direction selection vector, if the ith element on the vector is 1, it means that the ith index is selected at this time, and other elements are all 0, $\xi_i \in R^m$; and $\hat{x}_{ri}$ and $\hat{f}_i$ are end values obtained after optimizing $x_{ri}$, and $f_i$ through an argmin objective function.

Indexes for selection of the direction selection vector are constantly changed, for example, a first-dimension variable represents pH value, $\xi_i = [1,0,0, \ldots 0,0]^T$ represents a selective vector for the pH value, and an abnormal index is determined by finding an i value corresponding to a minimum reconstruction error.

Possible problems in the wastewater treatment process can be found through abnormality isolation, for example, if abnormality is caused by pH, pH stability can be achieved by changing reagent amount, thereby guaranteeing normal proceeding of the wastewater treatment process.

Based on the above method, an embodiment of the present invention further provides an intelligent monitoring apparatus for abnormal working conditions in a heavy metal wastewater treatment process based on transfer learning, including.

an offline dictionary construction module for constructing an offline dictionary by utilizing historically-collected heavy metal wastewater treatment data samples with fixed sources;

an augmented dictionary construction module for performing transfer learning on the offline dictionary through historically-collected effective heavy metal wastewater treatment data samples with unknown sources to construct an augmented dictionary;

a control limit generation module configured to calculate reconstruction errors of all the historical samples through the augmented dictionary, and calculate a control limit under a working condition in a heavy metal wastewater treatment process through a kernel density estimation method based on the reconstruction errors of all the historical samples; and an industrial system abnormality judgment module configured to calculate a reconstruction error of to-be-monitored data acquired online according to the augmented dictionary, compare the reconstruction error of the to-be-monitored data with the control limit and judge whether a current heavy metal wastewater treatment process working condition is abnormal or not according to a comparison result.

It is to be understood that functional unit modules in various embodiments of the present invention may be centralized in one processing unit, may also independently and physically exist, and may be achieved in a hardware or software form, or two or more unit modules may be integrated into one unit module.

Furthermore, an embodiment of the present invention further provides a computer storage medium configured to store programs. The intelligent monitoring method for the abnormal working conditions in the heavy metal wastewater treatment process based on transfer learning is achieved when the programs are executed. Beneficial effects of the computer storage medium refer to part of beneficial effects of the method and are not repeated herein.

A person skilled in the art can understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

At last, it should be noted that: The foregoing embodiments are merely used to illustrate the technical solutions of the present invention but not to limit them. Although the present invention has been described in detail with reference to the foregoing embodiments, those of ordinary skill in the art should understand that: they may still make modifications or make equivalent replacements to the embodiments of the present invention, and any modification or equivalent replacement without departing from the spirit and scope of the present invention shall be subject to the protection scope of the claims of the present invention.

What is claimed is:

1. A monitoring method for abnormal working conditions in a heavy metal wastewater treatment process based on transfer learning, comprising:

1) constructing an offline dictionary for heavy metal wastewater treatment data samples with fixed sources according to historically-collected heavy metal wastewater treatment data samples with fixed sources;

2) acquiring an augmented dictionary $D^{TD}$ corresponding to effective heavy metal wastewater treatment data samples with unknown sources by utilizing historically-collected effective heavy metal wastewater treatment data samples with unknown sources to perform the transfer learning on the offline dictionary;

3) calculating a reconstruction error of the effective heavy metal wastewater treatment data samples with unknown sources through the augmented dictionary $D^{TD}$, and acquiring a control limit under a working condition in the heavy metal wastewater treatment process through a kernel density estimation based on the reconstruction error; and 4) calculating a reconstruction error of to-be-monitored data $y_t$ under the augmented dictionary $D^{TD}$, wherein if the reconstruction error of to-be-monitored data $y_t$ calculated is less than the control limit, it is considered that a current heavy metal wastewater treatment process is normal, otherwise, it is considered that the current heavy metal wastewater treatment process is abnormal, a calculation of the reconstruction error refers to a 2-norm calculation of a sample collection value of a to-be-calculated reconstruction error and an expression value of the augmented dictionary $D^{TD}$ for samples and corresponding sparse coding;

5) setting direction selection vectors sequentially by setting an abnormal wastewater index positioning objective function, and determining a reconstruction error of each wastewater index under the augmented dictionary $D^{TD}$ until abnormal amplitudes on abnormal samples are converged to determine abnormal wastewater indexes; and 6) in response to determining that the abnormal wastewater indexes include PH, changing reagent amount to achieve pH stability.

2. The monitoring method according to claim 1, wherein the constructing the offline dictionary for the heavy metal wastewater treatment data samples with fixed sources comprises the following steps:

step 1.1: collecting historical samples, wherein a sensor is utilized for collecting heavy metal wastewater treatment historical samples with fixed sources, and a sample historical set with fixed sources is $Y^{SD}$; $Y^{SD} = [y_1, y_2, \ldots, y_{N_s}] \in R^{m \times Ns}$, $y_j$ represents an ith heavy metal wastewater treatment historical sample with fixed source, $1 \le j \le N_s$, each sample comprises m wastewater indexes {pH value, current density, conductivity, initial heavy metal concentration and flow}, the m is 5, and $N_s$ represents a number of samples in $Y^{SD}$; and step 1.2: representing $Y^{SD}$ through a dictionary $D_1$ and a sparse coding X based on a sparse representation principle, constructing an objective function of offline dictionary learning, and acquiring an optimal initial dictionary $D^{SD}$ corresponding to $Y^{SD}$ and a sparse coding $X^{SD}$ corresponding to $D^{SD}$ by solving the objective function of the offline dictionary learning, wherein the objective function of the offline dictionary learning constructed is specifically expressed as Formula (1):

$$\langle D^{SD}, X^{SD} \rangle = \underset{D_1, X}{\arg\min} \left\| Y^{SD} - D_1 X \right\|_2^2 \qquad (1)$$

$$\text{s.t. } \forall_i, \|x_i\|_0 \le T,$$

wherein, an initial value of the dictionary $D_1$ is a matrix formed by in-column arranging of K samples randomly selected from $Y^{SD}$, $K = 10 * m$, is a set value of a number of nonzero elements in each column of a sparse coding matrix, and $$\|\cdot\|_2^2$$

and $\|\cdot\|_0$ represent 2-norm and 0-norm correspondingly; and $x_i$ represents an ith column in X.

3. The monitoring method according to claim 2, wherein the objective function of the offline dictionary learning is solved through a K-SVD method, and the dictionary $D_1$ and the sparse coding X are constantly updated until the optimal initial dictionary $D^{SD}$ corresponding to $Y^{SD}$ is obtained.

4. The monitoring method according to claim 1, wherein the acquiring the augmented dictionary $D^{TD}$ by utilizing the historically-collected effective heavy metal wastewater treatment data samples with unknown sources to perform the transfer learning on the offline dictionary comprises the following steps:

utilizing a sensor for collecting effective heavy metal wastewater treatment historical samples with unknown sources, wherein an effective sample set with unknown sources is $Y^{SD}$; and utilizing an initial dictionary $D^{SD}$ and a corresponding sparse coding X for representing the $Y^{TD}$ based on a sparse representation principle, constructing an objective function of sparse coding corresponding to heavy metal wastewater treatment data samples with unknown sources, solving an optimal sparse coding $X^P$ corresponding to the effective sample set $Y^{TD}$ with unknown sources through the transfer learning, and then acquiring a corresponding optimal dictionary through $X^P$; wherein the objective function of sparse coding is specifically expressed as Formula (2):

$$X_p = \underset{X}{\arg\min} \left\| Y^{TD} - D_p X \right\|_2^2 \qquad (2)$$

$$\text{s.t. } \forall_i, \|x_i\|_0 \le T,$$

where, $D_p$ represents an interpolation dictionary in a transfer learning process, an initial value of $D_p$ represents an optimal initial dictionary $D^{SD}$ corresponding to the offline dictionary for the heavy metal wastewater treatment data samples with fixed sources, namely, when p=0, $D_0 = D^{SD}$; T is a set value of a number of nonzero elements in a sparse coding matrix, and $$\|\cdot\|_2^2$$

$\|\cdot\|_0$ represent 2-norm and 0-norm correspondingly; and $x_i$ represents an ith column in X.

5. The monitoring method according to claim 4, wherein the optimal dictionary corresponding to the effective sample set $Y^{TD}$ with unknown sources is solved by constructing the objective function of the sparse coding corresponding to the heavy metal wastewater treatment data samples with unknown sources; wherein the objective function of sparse coding is specifically expressed as Formula (3):

$$D_{p+1} = \underset{D}{\arg\min} \|Y^{TD} - DX_p\|_F^2 + \lambda\|D - D_p\|_F^2, \tag{3}$$

wherein, $\lambda$ represents a tuning parameter, and is [1,10]; D represents a to-be-solved dictionary, $D_{p+1}$ is assigned to a final dictionary solved through an iteration, and $D_{p+1}$ represents the optimal dictionary corresponding to the effective sample set $Y^{TD}$ with unknown sources;
a process of solving is as below: an updating result, $$D_{p+1} = \left(\lambda D_p + Y^{TD}X_p^T\right)\left(\lambda E + X_p X_p^T\right)^{-1}, \tag{}$$

of an interpolation dictionary is acquired by deriving $$\|Y^{TD} - DX_p\|_F^2 + \lambda\|D - D_p\|_F^2,$$

dictionary atoms of the augmented dictionary $D^{TD}$ are zoomed, $$D^{TD} = \left\{\frac{d_1^{TD}}{\|d_1^{TD}\|_2}, \cdots, \frac{d_K^{TD}}{\|d_K^{TD}\|_2}\right\},$$

the process is repeated until $$\|D_{p+1} - D_p\|_F^2 \le \delta,$$

and $\delta$ represents a stopping threshold set to 0.01; and
$X_p$ represents a sparse coding obtained in a pth-time iteration process, $X_p^T$ is transposition of $X_p$, E is a unit matrix, and $$d_1^{TD} \text{ and } d_K^{TD}$$

represent a 1st column and a Kth column of the augmented dictionary $D^{TD}$.

6. The monitoring method according to claim 1, wherein the acquiring the control limit under the working condition in the heavy metal wastewater treatment process through the kernel density estimation refers to calculating a kernel density function for reconstruction errors of historical samples with unknown sources according to a following formula, and a value of the kernel density function under a set confidence level serves as the control Emit the kernel density function is specifically expressed as Formula (4):

$$\hat{f}(e, H) = \frac{1}{n}\sum_{i=1}^{n} K\left[H^{-1/2}(e - e_i)\right], \tag{4}$$

wherein, e represents a distribution of to-be-fitted reconstruction errors of the historical samples with unknown sources, $e_i$ represents a reconstruction error of an 1th historical sample with unknown sources, H represents a bandwidth matrix, n represents a sum of the historical samples, and K[ ] represents a kernel function; and $\hat{\theta}(e, H)$ refers to a curve fitted through the historical samples $e_i$ with unknown sources under H.

7. The monitoring method according to claim 1, wherein the abnormal wastewater index positioning objective function is specifically expressed as Formula (5):

$$\left(\hat{x}_{ri}, \hat{f}_i\right) = \underset{x_i, f_i}{\arg\min}\|y_f - \xi_i f_i - D^{TD}x_{ri}\|_2^2 \tag{5}$$

$$\text{s.t. } \|\hat{x}_{ri}\|_0 \le T,$$

$$Re_i = \|y_f - \xi_i\hat{f}_i - D^{TD}\hat{x}_i\|, \forall_i, \tag{6}$$

wherein, $y_f$ is an abnormal sample in the heavy metal wastewater treatment process, $y_i = y_f - \xi_i f_i$, $y_i$ is a to-be-reconstructed sample with an Ah-dimension index of $y_f$ being isolated, and values of other dimensions of indexes are kept unchanged, and $f_i$ is a reconstruction amplitude of the ith-dimension index in $y_f$; $x_{ri}$ is a sparse coding of $y_i$ under the augmented dictionary, and an initial value of $x_{ri}$ is a sparse coding of $y_f$ under the augmented dictionary; $R_{e_i}$ is a reconstruction error of an ith wastewater index in $y_f$ on the augmented dictionary, and $D^{TD}$ represents the augmented dictionary; $\xi_i$ represents a direction selection vector, if an ith element on the direction selection vector is 1, the ith wastewater index is selected at this time, and other elements are all 0, $\xi_i \in R^m$; and $\hat{x}_{ri}$ and $\hat{f}_i$ are end values obtained after optimizing $x_{ri}$ and $f_i$ by solving the abnormal wastewater index positioning objective function.

8. A computer storage medium, configured to storage programs, wherein when being executed, the programs are used for implementing the monitoring method according to claim 1.

9. The computer storage medium according to claim 8, wherein in the monitoring method, the constructing the offline dictionary for the heavy metal wastewater treatment data samples with fixed sources comprises the following steps:
step 1.1: collecting historical samples,
wherein a sensor is utilized for collecting heavy metal wastewater treatment historical samples with fixed sources, and a sample set with fixed sources is $Y^{SD}$; $Y^{SD} = [y_1, y_2, \ldots, y_{N_s}] \in R^{m \times N_s}$, $y_j$ represents an jth heavy metal wastewater treatment historical sample

19

20 with fixed source, $1 \leq j \leq N_s$, each sample comprises m wastewater indexes {pH value, current density, conductivity, initial heavy metal concentration and flow}, the m is 5, and $N_s$ represents a number of samples in $Y^{SD}$; and step 1.2: representing $Y^{SD}$ through a dictionary $D_1$ and a sparse coding X based on a sparse representation principle, constructing an objective function of offline dictionary learning, and acquiring an optimal initial dictionary $D^{SD}$ corresponding to $Y^{SD}$ and a sparse coding $X^{SD}$ corresponding to $D^{SD}$ by solving the objective function of the offline dictionary learning, wherein the objective function of the offline dictionary learning constructed Is specifically expressed as Formula (1):

$$\langle D^{SD}, X^{SD} \rangle = \underset{D_1, X}{\arg\min} \| Y^{SD} - D_1 X \|_2^2 \qquad (1)$$

$$\text{s.t. } \forall_i, \|x_i\|_0 \leq T,$$

wherein, an initial value of the dictionary $D_1$ is a matrix formed by in-column arranging of K samples randomly selected from $Y^{SD}$, K=10*m, T is a set value of a number of nonzero elements in each column of a sparse coding matrix, and $$\|\cdot\|_2^2$$

and $\|\cdot\lambda_0$ represents 2-norm and 0-norm correspondingly; and $x_i$ represents an 1th column in X.

10. The computer storage medium according to claim 9, wherein in the monitoring method, the objective function of the offline dictionary learning is solved through a K-SVD method, and the dictionary $D_1$ and the sparse coding X are constantly updated until the optimal initial dictionary $D^{SD}$ corresponding to $Y^{SD}$ is obtained.

11. The computer storage medium according to claim 8, wherein in the monitoring method, the acquiring the augmented dictionary $D^{TD}$ by utilizing the historically-collected effective heavy metal wastewater treatment data samples with unknown sources to perform the transfer learning on the offline dictionary comprises the following steps:

utilizing a sensor for collecting effective heavy metal wastewater treatment historical samples with unknown sources, wherein an effective sample set with unknown sources is $Y^{SD}$; and utilizing an initial dictionary $D^{SD}$ and a corresponding sparse coding X for representing the $Y^{TD}$ based on a sparse representation principle, constructing an objective function of sparse coding corresponding to heavy metal wastewater treatment data samples with unknown sources, solving an optimal sparse coding $X^P$ corresponding to the effective sample set $Y^{TD}$ with unknown sources through the transfer learning, and then acquiring a corresponding optimal dictionary through $X^P$; wherein the objective function of sparse coding is specifically expressed as Formula (2):

$$X_p = \underset{X}{\arg\min} \| Y^{TD} - D_p X \|_2^2 \qquad (2)$$

$$\text{s.t. } \forall_i, \|x_i\|_0 \leq T,$$

where, $D_p$ represents an interpolation dictionary in a transfer learning process, an initial value of $D_p$ represents an optimal initial dictionary $D^{SD}$ corresponding to the offline dictionary for the heavy metal wastewater treatment data samples with fixed sources, namely, when p=0, $D_0 = D^{SD}$; T is a set value of a number of nonzero elements in a sparse coding matrix, and $$\|\cdot\|_2^2$$

and $\|\cdot\|_0$ represent 2-norm and 0-norm correspondingly; and $x_i$ represents an 1th column in X.

12. The computer storage medium according to claim 11, wherein in the monitoring method, the optimal dictionary corresponding to the effective sample set $Y^{TD}$ with unknown sources is solved by constructing the objective function of the sparse coding corresponding to the heavy metal wastewater treatment data samples with unknown sources; wherein the objective function of sparse coding is specifically expressed as Formula (3):

$$D_{p+1} = \underset{D}{\arg\min} \| Y^{TD} - DX_p \|_F^2 + \lambda \| D - D_p \|_F^2 \qquad (3)$$

wherein, $\lambda$ represents a tuning parameter, and is [1,10]; D represents a to-be-solved dictionary, $D_{p+1}$ is assigned to a final dictionary solved through an Iteration, and $D_{p+1}$ represents the optimal dictionary corresponding to the effective sample set $Y^{TD}$ with unknown sources; a process of solving is as below: an updating result, $$D_{p+1} = \left( \lambda D_p + Y^{TD} X_p^T \right) \left( \lambda E + X_p X_p^T \right)^{-1},$$

of an interpolation dictionary is acquired by deriving $\| Y^{TD} - DX_p \|_F^2 + \lambda \| D - D_p \|_F^2$, dictionary atoms of the augmented dictionary $D^{TD}$ are zoomed, $$D^{TD} = \left\{ \frac{d_1^{TD}}{\| d_1^{TD} \|_2}, \ldots, \frac{d_K^{TD}}{\| d_K^{TD} \|_2} \right\},$$

the process is repeated until $$\| D_{p+1} - D_p \|_F^2 \leq \delta,$$

and $\delta$ represents a stopping threshold set to 0.01; and $X_p$ represents a sparse coding obtained in a pth-time iteration process, $X_p^T$ is transposition of $X_p$, E is a unit matrix, and $$d_1^{TD} \text{ and } d_K^{TD}$$

represent a 1st column and a Kth column of the augmented dictionary $D^{TD}$.

13. The computer storage medium according to claim 8, wherein in the monitoring method, a calculation of the reconstruction error refers to a 2-norm calculation of a sample collection value of a to-be-calculated reconstruction error and an expression value of the augmented dictionary $D^{TD}$ for samples and corresponding sparse coding.

14. The computer storage medium according to claim 8, wherein in the monitoring method, the acquiring the control limit under the working condition in the heavy metal wastewater treatment process through the kernel density estimation refers to calculating a kernel density function for reconstruction errors of historical samples with unknown sources according to a following formula, and a value of the kernel density function under a set confidence level serves as the control limit, the kernel density function is specifically expressed as Formula (4):

$$\hat{f}(e, H) = \frac{1}{n} \sum_{i=1}^{n} K\left[H^{-1/2}(e - e_i)\right], \tag{4}$$

wherein, e represents a distribution of to-be-fitted reconstruction errors of the historical samples with unknown sources, $e_i$ represents a reconstruction error of an ith historical sample with unknown sources, H represents a bandwidth matrix, n represents a sum of the historical samples, and K[ ] represents a kernel function; and $\hat{f}(e, H)$ refers to a curve fitted through the historical samples $e_i$ with unknown sources under H.

15. The computer storage medium according to claim 8, wherein the abnormal wastewater index positioning objective function is specifically expressed as Formula (5):

$$(\hat{x}_{ri}, \hat{f}_i) = \operatorname*{argmin}_{x_i, f_i} \left\| y_f - \xi_i f_i - D^{TD} x_{ri} \right\|_2^2 \tag{5}$$

$$\text{s.t. } \|\hat{x}_{ri}\|_0 \le T,$$

$$Re_i = \left\| y_f - \xi_i \hat{f}_i - D^{TD} \hat{x}_i \right\|, \forall_i, \tag{6}$$

wherein, $y_f$ is an abnormal sample in the heavy metal wastewater treatment process, $y_i = y_f - \xi_i f_i$, $y_i$ is a to-be-reconstructed sample with an ith-dimension index of $y_f$ being isolated, and values of other dimensions of indexes are kept unchanged, and $f_i$ is a reconstruction amplitude of the ith-dimension index in $y_f$; $x_{ri}$ is a sparse coding of $y_i$ under the augmented dictionary, and an initial value of $x_{ri}$ is a sparse coding of $y_f$ under the augmented dictionary; $R_{e_i}$ is a reconstruction error of an ith wastewater index in $y_f$ on the augmented dictionary, and $D^{TD}$ represents the augmented dictionary; $\xi_i$ represents a direction selection vector, if an jth element on the direction selection vector is 1, the ith wastewater index is selected at this time, and other elements are all 0, $\xi_i \in R^m$; and $x_{ri}$ and $\hat{f}_i$ are end values obtained after optimizing $x_{ri}$ and $f_i$ through by solving the abnormal wastewater index positioning objective function.

\* \* \* \* \*